(12) United States Patent
Urban

(10) Patent No.: US 10,119,600 B2
(45) Date of Patent: Nov. 6, 2018

(54) RECIRCULATING BALL NUT, ASSEMBLY FOR A BALLSCREW DRIVE AND METHOD FOR PRODUCING A RECIRCULATING BALL NUT

(71) Applicant: TRW Automotive GmbH, Alfdorf (DE)

(72) Inventor: Peter Urban, Kerken (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 15/119,140

(22) PCT Filed: Jan. 27, 2015

(86) PCT No.: PCT/EP2015/051615
§ 371 (c)(1),
(2) Date: Aug. 16, 2016

(87) PCT Pub. No.: WO2015/124387
PCT Pub. Date: Aug. 27, 2015

(65) Prior Publication Data
US 2017/0030448 A1    Feb. 2, 2017

(30) Foreign Application Priority Data

Feb. 19, 2014    (DE) .................... 10 2014 102 132

(51) Int. Cl.
*F16H 1/24*    (2006.01)
*F16H 55/02*    (2006.01)
(Continued)

(52) U.S. Cl.
CPC .......... *F16H 25/2223* (2013.01); *B21K 1/04* (2013.01); *B21K 1/26* (2013.01); *B23C 3/28* (2013.01);
(Continued)

(58) Field of Classification Search
CPC ................ F16H 25/24; F16H 25/2204; F16H 2025/2481; F16H 2025/2081;
(Continued)

(56) References Cited

U.S. PATENT DOCUMENTS

| 4,145,798 A * | 3/1979 | Sarnes ...................... B21J 5/00 148/220 |
| 8,789,648 B2 | 7/2014 | Lee |

(Continued)

FOREIGN PATENT DOCUMENTS

| CN | 102869463 A | 1/2013 |
| CN | 102906457 A | 1/2013 |

(Continued)

OTHER PUBLICATIONS

German Search Report, Application No. DE 10 2014 102 132.0, dated Aug. 11, 2014.

(Continued)

*Primary Examiner* — Jake Cook
(74) *Attorney, Agent, or Firm* — MacMillan, Sobanski & Todd, LLC

(57) ABSTRACT

A method of manufacturing a recirculating ball nut for a ball screw drive, comprising a base body which includes at least one recirculating ball track, the method comprising the following manufacturing steps: manufacturing the base body by precision forging; and finishing the recirculating ball track by a cutting method subsequent to manufacturing the base body.

2 Claims, 2 Drawing Sheets

(51) Int. Cl.
  *F16H 25/22* (2006.01)
  *B62D 5/04* (2006.01)
  *F16H 25/24* (2006.01)
  *B21K 1/04* (2006.01)
  *B21K 1/26* (2006.01)
  *B23C 3/28* (2006.01)
  *F16H 25/20* (2006.01)

(52) U.S. Cl.
  CPC ......... *B62D 5/0424* (2013.01); *B62D 5/0448* (2013.01); *F16H 25/2204* (2013.01); *F16H 25/24* (2013.01); *B23C 2220/28* (2013.01); *F16H 2025/2081* (2013.01); *F16H 2025/2096* (2013.01); *F16H 2025/2481* (2013.01)

(58) Field of Classification Search
  CPC ......... F16H 2025/2096; B62D 5/0448; B62D 5/0424; B21K 1/04; B21K 1/26; B23C 2220/28; B23C 3/28
  See application file for complete search history.

(56) References Cited

U.S. PATENT DOCUMENTS

| | | | |
|---|---|---|---|
| 8,800,341 | B2 | 8/2014 | Osterlanger et al. |
| 8,950,283 | B2 | 2/2015 | Watanabe et al. |
| 9,737,926 | B2 | 8/2017 | Harada et al. |
| 2007/0151794 | A1 | 7/2007 | Mizutani et al. |
| 2009/0107269 | A1* | 4/2009 | Prichard ............... F16H 25/20 74/89.35 |
| 2010/0043582 | A1* | 2/2010 | Tateishi ............... B23L 327/065 74/424.81 |
| 2010/0051378 | A1 | 3/2010 | Kurokawa |
| 2012/0085139 | A1 | 4/2012 | Osterlanger et al. |
| 2013/0048411 | A1* | 2/2013 | Lee ............... B62D 5/0427 180/444 |
| 2014/0260728 | A1* | 9/2014 | Holm ............... B62D 5/0448 74/89.23 |
| 2017/0030448 | A1* | 2/2017 | Urban ............... B62D 5/0424 |

FOREIGN PATENT DOCUMENTS

| | | |
|---|---|---|
| DE | 102006041719 A1 | 3/2008 |
| DE | 102009036824 A1 | 2/2011 |
| DE | 102012017192 A1 | 2/2013 |
| EP | 2532924 A1 | 12/2012 |
| JP | 2006027577 A | 2/2006 |
| JP | 2012149734 A | 8/2012 |

OTHER PUBLICATIONS

PCT International Preliminary Report on Patentability, Application No. PCT/EP2015/051615, dated Aug. 23, 2016.
Chinese Office Action, Application No. 201580009394X, dated Feb. 8, 2018.

* cited by examiner

RECIRCULATING BALL NUT, ASSEMBLY FOR A BALLSCREW DRIVE AND METHOD FOR PRODUCING A RECIRCULATING BALL NUT

CROSS-REFERENCE TO RELATED APPLICATIONS

This application is a national stage of International Application No. PCT/EP2015/051615 filed 27 Jan. 2015, the disclosures of which are incorporated herein by reference in entirety, and which claimed priority to German Patent Application No. 10 2014 102 132.0 filed 19 Feb. 2014, the disclosures of which are incorporated herein by reference in entirety.

BACKGROUND OF THE INVENTION

The invention relates to a recirculating ball nut and an assembly for a ball screw drive. The invention further relates to a method of manufacturing a recirculating ball nut.

Ball screw drives are employed in power steering systems in vehicles, for example. The recirculating ball nut is mounted on the steering linkage of the vehicle, the recirculating ball nut being held stationarily in the longitudinal direction of the steering linkage and mounted for rotation in relation to the steering linkage. Concurrent threads are provided in the recirculating ball nut and on the steering linkage. Provided between the recirculating ball nut and the steering linkage are transmission means, for example balls, which engage in both threads and in this way couple the recirculating ball nut and the steering linkage to each other. When the recirculating ball nut is rotated relative to the steering linkage, for example by a belt drive engaging the outer periphery of the recirculating ball nut, the steering linkage is shifted relative to the recirculating ball nut in the longitudinal direction by means of the balls. This allows the ball screw drive to apply an additional steering force on the steering linkage, for example.

In order to ensure both as effective a steering force assistance as possible and a reliable force transmission from the drive to the steering linkage, it is required that the recirculating ball tracks be manufactured with a very low manufacturing tolerance, so that the balls have a very small play in the recirculating ball tracks while they can still roll in the recirculating ball tracks with low friction. Until now, forging methods have been used for manufacturing the recirculating ball nuts; the known forging methods do not ensure a sufficient precision for the manufacture of the ball tracks, or a very great manufacturing effort is involved in reaching the desired precision. In addition, the internal recirculating ball tracks are difficult to access, which increases the manufacturing effort. Alternative manufacturing methods such as milling feature the drawback that very large amounts of materials are required.

BRIEF SUMMARY OF THE INVENTION

It is the feature of the invention to provide a recirculating ball nut and an assembly for a ball screw drive which are simpler and faster to manufacture and have a lower manufacturing tolerance. A further object of the invention is to provide a material-saving method of manufacturing such a recirculating ball nut.

To achieve the feature, provision is made for a recirculating ball nut for a ball screw drive, having a base body which includes at least one recirculating ball track, the base body being a forged component and the recirculating ball track being manufactured by a cutting manufacturing method.

According to the invention, the advantages of different methods, that is, the forging method on the one hand and the cutting method on the other hand, are combined. The base body is manufactured in a forging process, which allows a material-saving manufacture. The recirculating ball tracks can already be roughly incorporated into the base body in the forging process. Subsequently, the recirculating ball tracks are manufactured or finished by a cutting method, allowing the recirculating ball tracks to be produced with a very high precision.

Manufacturing the recirculating ball track by using a cutting manufacturing method additionally has the advantage that this method is easier to realize in the case of a one-piece recirculating ball nut. In a forging method, it is difficult to work the recirculating ball tracks located inside, so that the recirculating ball nut is frequently divided in a plurality of segments in the peripheral direction, which are manufactured separately and are subsequently joined together. This, however, results in steps or shoulders in the areas of the joints, hindering the transmission means in the recirculating ball nut from moving smoothly. In a recirculating ball nut according to the invention, it is possible that the base body is at first provided with a smooth internal surface in the forging process, which also allows the recirculating ball nut to be manufactured in one piece since no undercuts on the inner surface of the base body are required. Subsequently, the recirculating ball tracks can be incorporated with a very high precision by a cutting process.

Preferably, the base body may be manufactured by a precision forging method, so that it already has very low manufacturing tolerances. In this way, the amount of material which is subsequently removed by the cutting process can be kept very small.

The recirculating ball track may be manufactured by milling, for example, so that a very high precision of the recirculating ball track is feasible.

To achieve the feature, provision is further made for an assembly for a ball screw drive of a power steering, including a belt pulley and a recirculating ball nut according to the invention, the belt pulley being connected to the recirculating ball nut so as to be non-rotatable relative thereto. This two-part structure allows a simple manufacture of the assembly since both the belt pulley and the recirculating ball nut can be manufactured separately. The components are not fitted together until they have been manufactured with the desired precision. It is also possible to use separate manufacturing methods for the two components.

For connecting the two components, the belt pulley and the recirculating ball nut may have corresponding flanges provided thereon which are connected by means of fastening means, in particular rivets or bolts, so as to prevent relative rotation. In the longitudinal direction of the steering linkage, the belt pulley and the recirculating ball nut preferably rest against each other via these flanges, so that a mutual displacement in the longitudinal direction is prevented by the flanges and the fastening means.

To achieve the feature, provision is further made for a method of manufacturing a recirculating ball nut for a ball screw drive, having a base body which includes at least one recirculating ball track, the method including the following manufacturing steps:
  manufacturing the base body by a forging method; and
  finishing the recirculating ball track by a cutting method subsequent to manufacturing the base body.

Preferably, the recirculating ball track is milled subsequent to manufacturing the base body.

Other advantages of this invention will become apparent to those skilled in the art from the following detailed description of the preferred embodiments, when read in light of the accompanying drawings.

DETAILED DESCRIPTION OF THE INVENTION

Figure 1:
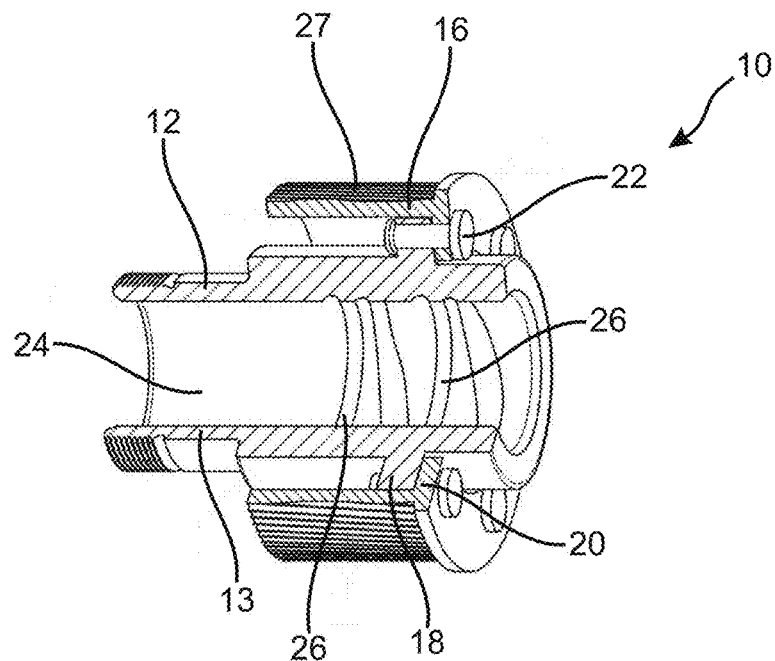
FIG. 1 shows a partly sectional and perspective view of an assembly according to the invention, for a ball screw drive with a recirculating ball nut according to the invention.
Figure 2:
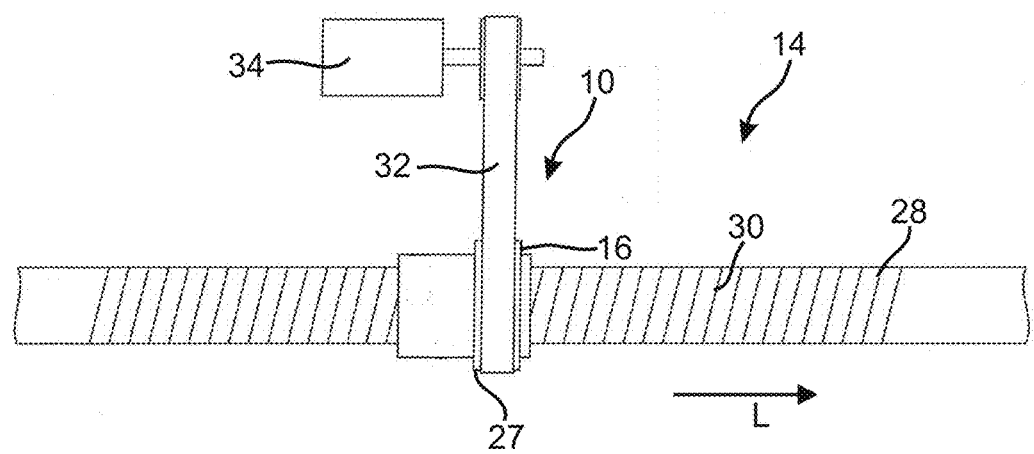
FIG. 2 shows a schematic illustration of a power steering with an assembly according to the invention.

FIG. 1 shows an assembly 10 having a recirculating ball nut 12 for a power steering 14 which is partly shown in FIG. 2. In addition to the recirculating ball nut 12, the assembly 10 includes a belt pulley 16 which is connected to the recirculating ball nut 12 so as to be non-rotatable relative thereto.

As can be seen in FIG. 1, the recirculating ball nut 12 includes a substantially cylindrical base body 13. The base body 13 of the recirculating ball nut 12 and also the belt pulley 16 have flanges 18, 20 provided thereon which rest against each other in a longitudinal direction L and are firmly connected with each other in the longitudinal direction L and also in the peripheral direction by means of a plurality of fastening means 22, which are rivets in the embodiment shown here. Provided on the inner surface 24 of the recirculating ball nut 12 is a plurality of recirculating ball tracks 26 formed similar to a thread. A tooth profile 27 is provided on the outside of the belt pulley.

The power steering 14 shown in FIG. 2 includes a steering linkage 28 having a thread 30 that corresponds in terms of orientation and pitch to the recirculating ball tracks 26 of the recirculating ball nut 12. The assembly 10 is mounted for rotation in relation to the steering linkage 28 and held in a thrust-resistant manner in the longitudinal direction L. Provided between the recirculating ball nut 12 and the steering linkage 28 is a plurality of transmission means, in particular balls, which engage in both the recirculating ball tracks 26 and in the thread 30 of the steering linkage 28, as a result of which the recirculating ball nut 12 is coupled to the steering linkage 28.

The belt pulley 16 of the assembly 10 is coupled to a drive 34 of the power steering 14 via a belt 32. When the assembly 10 is rotated by the drive 34, the steering linkage 28 is displaced in the longitudinal direction L by means of the coupling via the balls, as a result of which a steering assist force acts on the steering linkage 28.

In order to ensure a reliable function of the assembly 10 and thus of the power steering 14, it is required for the recirculating ball tracks 26 to be manufactured with a very high precision, so that the transmission means can roll therein with a very low resistance while still featuring as little play as possible.

Figure 3A:
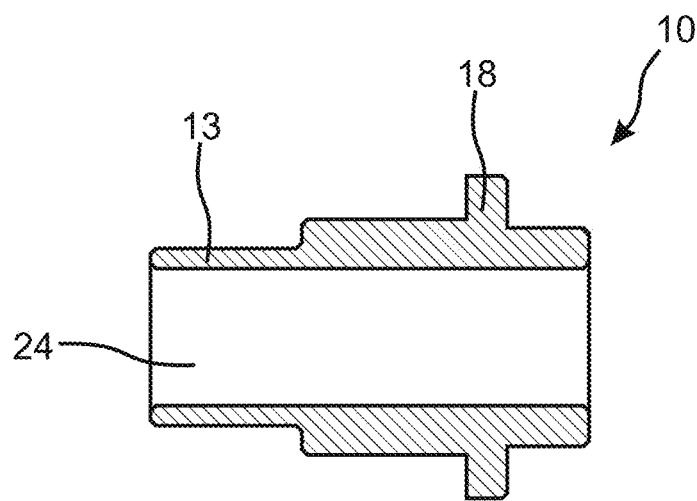
FIGS. 3a and 3b show schematic illustrations of various method steps of a method according to the invention for manufacturing a recirculating ball nut according to the invention.
Figure 3B:
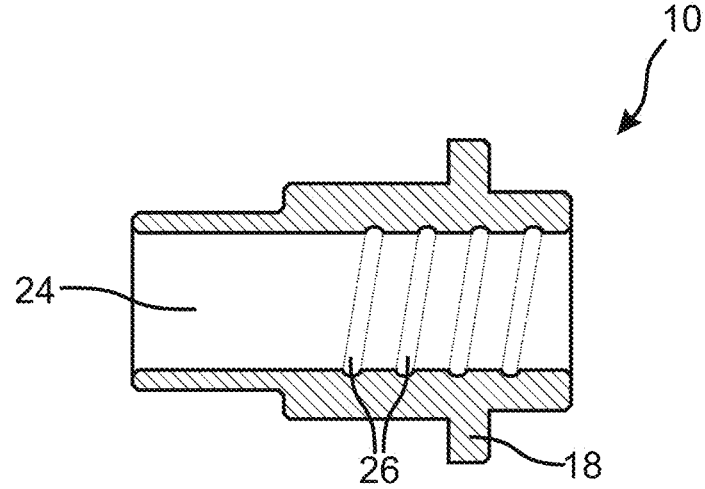

According to the invention, the recirculating ball nut 12 or the base body 13 of the recirculating ball nut 12 is manufactured in a forging method, in particular a precision forging method (FIG. 3a). Subsequently, the recirculating ball tracks 26 are manufactured or finished by a cutting manufacturing method, for example by milling (FIG. 3b).

This manufacturing method allows the recirculating ball nut 12 to be produced quickly and in a simple fashion. The forging method allows a material-saving manufacture of the base body 13, so that very little material is wasted. Manufacturing the entire base body 13 or the recirculating ball nut 12 by a cutting manufacturing method, on the other hand, would involve a very high material usage. For this reason, this method, which allows very low manufacturing tolerances, is made use of exclusively for manufacturing and/or for finishing those areas of the recirculating ball nut 12 where such precision is necessary, that is, the recirculating ball tracks 26. Applying the cutting manufacturing methods exclusively to the recirculating ball tracks allows a material-saving manufacture of the recirculating ball nut 12.

Instead of a milling method, any other suitable cutting manufacturing method may also be used for manufacturing the recirculating ball tracks 26.

In the embodiment shown here, the assembly 10 has a two-part configuration, with a belt pulley 16 and a recirculating ball nut 12. Depending on the structure of the assembly 10, however, these components may also be formed integrally with each other. In particular, the belt pulley 16 may be part of the base body 13 of the recirculating ball nut 12.

The connection preventing relative rotation between the belt pulley 16 and the recirculating ball nut 12 may also be produced in other ways, for example by a suitable torque transmission profile. In particular, instead of the rivets, bolts or other suitable fastening means 22 may also be used.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method of manufacturing a recirculating ball nut for a ball screw drive, comprising a base body which includes at least one recirculating ball track, the method comprising the following manufacturing steps:
   manufacturing the base body by precision forging; and
   finishing the at least one recirculating ball track by a cutting method subsequent to manufacturing the base body;
   wherein the at least one recirculating ball track is roughly incorporated into the base body by the precision forging step.

2. The method according to claim 1, wherein the at least one recirculating ball track is milled.

\* \* \* \* \*